US012657412B2

(12) United States Patent
Andre et al.

(10) Patent No.: US 12,657,412 B2
(45) Date of Patent: Jun. 16, 2026

(54) WIRELESS ANCHORS FOR ASSET TRACKING

(71) Applicant: CHORUSVIEW, INC., Las Vegas, NV (US)

(72) Inventors: David Andre, San Francisco, CA (US); Erich Karl Nachbar, Foster City, CA (US)

(73) Assignee: CHORUSVIEW, INC., Mountain View, CA (US)

( * ) Notice: Subject to any disclaimer, the term of this patent is extended or adjusted under 35 U.S.C. 154(b) by 0 days.

(21) Appl. No.: 17/830,510

(22) Filed: Jun. 2, 2022

(65) Prior Publication Data

US 2023/0394257 A1    Dec. 7, 2023

(51) Int. Cl.
*G06K 7/10*        (2006.01)
*G06Q 10/087*      (2023.01)
(52) U.S. Cl.
CPC ....... *G06K 7/10366* (2013.01); *G06Q 10/087* (2013.01)
(58) Field of Classification Search
CPC .......................... G06K 7/10366; G06Q 10/087
See application file for complete search history.

(56) References Cited

U.S. PATENT DOCUMENTS 8,442,553  B2    5/2013    Cardona et al.
10,192,416  B2    1/2019    Emmanuel et al.
10,571,547  B2    2/2020    Oh et al.
10,852,441  B2    12/2020    Krzych et al.
(Continued)

FOREIGN PATENT DOCUMENTS

EP        2149227  B1    1/2018
EP        3262339  *    8/2021    ............... G01S 1/04
            (Continued)

OTHER PUBLICATIONS

"Indoor Positioning Systems based on BLE Beacons", https://locatify.com/blog/indoor-positioning-systems-ble-beacons, 2015, pp. 1-11.
(Continued)

*Primary Examiner* — Patrick N Edouard
*Assistant Examiner* — Eboni N Giles
(74) *Attorney, Agent, or Firm* — Botos Churchill IP Law LLP

(57)                ABSTRACT

The technology enables locating asset tracking tags based on one or more beacon signals from at least one anchor beacon. Each of the beacon signals including anchor beacon identification information and being associated with a received signal strength upon receipt at a reader device. The anchor beacon identification information being associated with a physical location of the anchor beacon. A position of the reader device is estimated according to the received signal strength of the one or more beacon signals and the physical location of the at least one anchor beacon from the anchor beacon identification information. One or more signals from an asset tracking tag are detected by the reader device. A location of the asset tracking tag is identified based on the estimated position of the reader device and signal strength information for each of the one or more detected signals from the asset tracking tag.

20 Claims, 7 Drawing Sheets

(56) References Cited

U.S. PATENT DOCUMENTS

| | | | | |
|---|---|---|---|---|
| 2009/0303009 | A1* | 12/2009 | Itasaki | H04Q 9/00 |
| | | | | 340/10.1 |
| 2016/0026837 | A1 | 1/2016 | Good et al. | |
| 2019/0124470 | A1 | 4/2019 | Jiang et al. | |
| 2019/0317184 | A1 | 10/2019 | Hedley et al. | |
| 2020/0103488 | A1 | 4/2020 | Wirola et al. | |
| 2021/0041547 | A1 | 2/2021 | Lee | |
| 2021/0335488 | A1* | 10/2021 | Higginson | G16H 40/40 |
| 2022/0030393 | A1 | 1/2022 | Collins | |
| 2022/0245369 | A1* | 8/2022 | Groomes | G06Q 10/087 |
| 2022/0268875 | A1* | 8/2022 | Szebenyei | G01S 5/0289 |
| 2023/0161023 | A1* | 5/2023 | Rumar | G01S 13/42 |
| | | | | 342/146 |

FOREIGN PATENT DOCUMENTS

| | | | |
|---|---|---|---|
| JP | 2005291793 | A | 10/2005 |
| JP | 2019113461 | A | 7/2019 |
| JP | 2019151452 | A | 9/2019 |
| JP | 2020144908 | A | 9/2020 |
| WO | 2013044137 | A1 | 3/2013 |

OTHER PUBLICATIONS

Gu, Yu, et al., "Energy-Efficient Indoor Localization of Smart Hand-Held Devices Using Bluetooth", https://ieeexplore.ieee.org/abstract/document/7118131, 2021, pp. 1-25.

Ji, Myungin, et al., "Analysis of Positioning accuracy corresponding to the number of BLE beacons in indoor positioning system", IEEE conference, https://ieeexplore.ieee.org/abstract/document/7224764, 2021, pp. 1-3.

Jiménez, A.R., et al., "Finding objects using UWB or BLE localization technology: A museum-like use case", https://ieeexplore.ieee.org/abstract/document/8115865, 2017, pp. 1-3.

Kolakowski, Jerzy, et al., "UWB/BLE Tracking System for Elderly People Monitoring", Sensors 2020, 20, 1574; doi:10.3390/s20061574, pp. 1-22.

Kriz, Pavel, et al., "Improving Indoor Localization Using Bluetooth Low Energy Beacons", Hindawi Publishing Corp., vol. 2016, pp. 1-11.

Park, Jung Kwang, et al., "A Situation-Aware Indoor Localization (SAIL) System Using a LF and RF Hybrid Approach", Sensors, MDPI, Sensors 2018, 18, 3864; doi:10.3390/s18113864, pp. 1-16.

Paul, Anindya, et al., "RSSI-Based Indoor Localization and Tracking Using sigma-Point Kalman Smoothers", IEEE Journal of Selected Topics in Signal Processing, vol. 3, No. 5, 2009, pp. 860-873.

Pusnik, Maja, et al., "Improved Bluetooth Low Energy Sensor Detection for Indoor Localization Services", Sensors, MDPI, Sensors 2020, 20, 2336; doi:10.3390/s20082336, pp. 1-27.

Qureshi, Umair Mujtaba, et al., "Evaluating the Implications of Varying Bluetooth Low Energy (BLE) Transmission Power Levels on Wireless Indoor Localization Accuracy and Precision", Sensors, MDPI, 2019, pp. 1-28.

Rezazadeh, Javad, et al., "Transmission Power Adjustment Scheme for Mobile Beacon-Assisted Sensor Localization", To Appear at IEEE Transactions on Industrial Informatics 2018, pp. 1-9.

Sadowski, Sebastian, et al., "RSSI-Based Indoor Localization with the Internet of Things", IEEE Access, vol. 6, 2018, pp. 30149-30161.

Tuncer, Sevil, "Indoor localization with Bluetooth technology using Artificial Neural Networks", https://ieeexplore.ieee.org/abstract/document/7329709, 2021, pp. 1-3.

Zanella, Andrea, et al., "Experimental comparison of RSSI-based localization algorithms for indoor wireless sensor networks", ResearchGate, 2008, pp. 1-6.

International Search Report and Written Opinion for corresponding Application No. PCT/US2023/023637 dated Sep. 18, 2023 (6 pages).

Office Action for Japanese Patent Application No. 2024-556071, Nov. 17, 2025, 18 Pages.

Partial supplementary European Search Report for Application No. EP23816602 dated Jan. 15, 2026, 12 pp.

Extended European Search Report issued in corresponding European Patent Application No. 23816602.9, mailed Mar. 23, 2026, 12 pages.

* cited by examiner

Warehouse

In Transit

Hospital

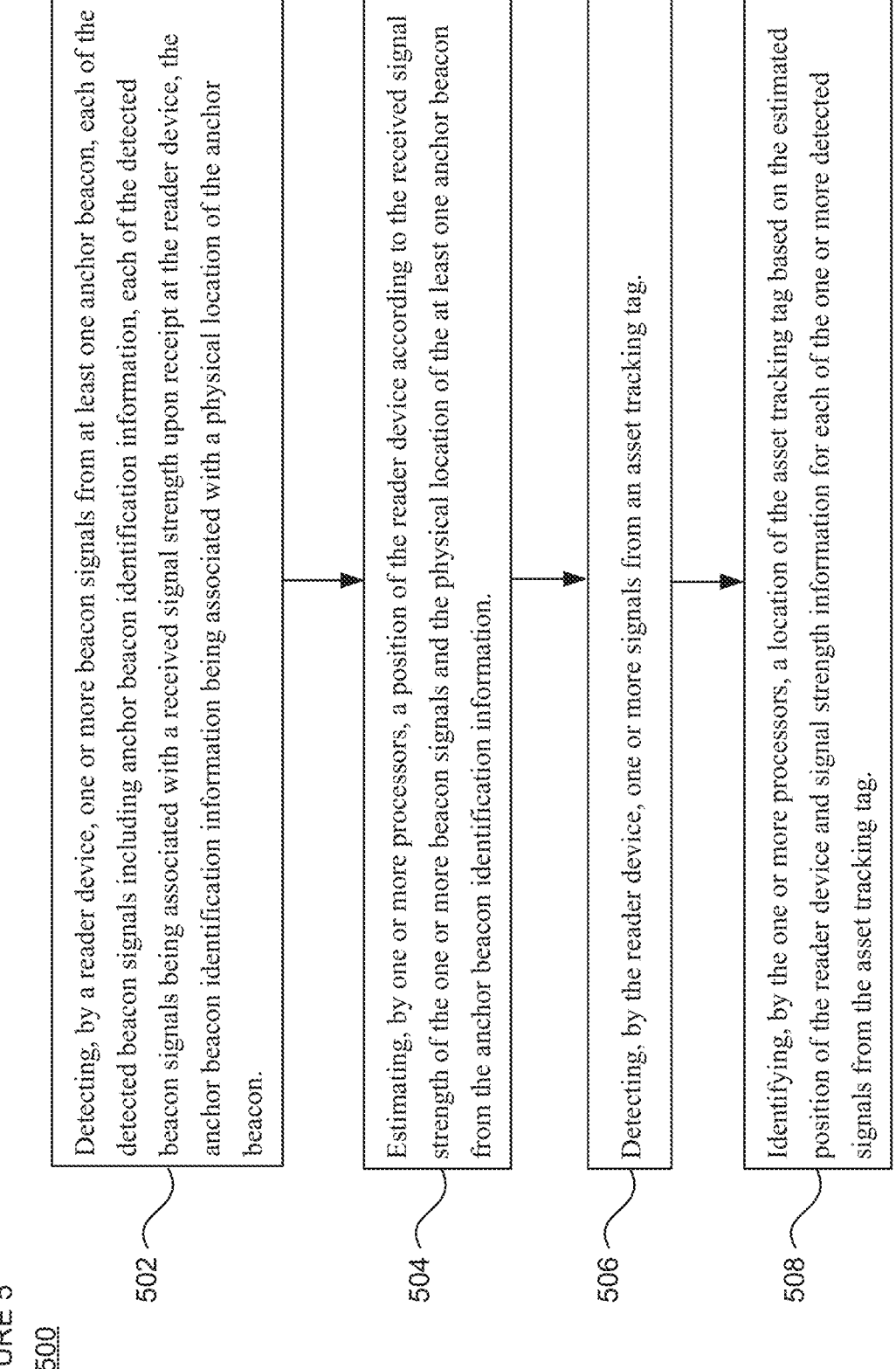

502 Detecting, by a reader device, one or more beacon signals from at least one anchor beacon, each of the detected beacon signals including anchor beacon identification information, each of the detected beacon signals being associated with a received signal strength upon receipt at the reader device, the anchor beacon identification information being associated with a physical location of the anchor beacon.

504 Estimating, by one or more processors, a position of the reader device according to the received signal strength of the one or more beacon signals and the physical location of the at least one anchor beacon from the anchor beacon identification information.

506 Detecting, by the reader device, one or more signals from an asset tracking tag.

508 Identifying, by the one or more processors, a location of the asset tracking tag based on the estimated position of the reader device and signal strength information for each of the one or more detected signals from the asset tracking tag.

WIRELESS ANCHORS FOR ASSET TRACKING

BACKGROUND

The Internet of Things (IoT) is the inter-networking of physical objects, such as products, packages, vehicles, buildings, etc., that are embedded with electronic components for network connectivity. The embedded components enable objects to detect others, be detected by others, collect data and/or transmit data. In some examples, the embedded components may include tags or labels attached to the physical objects. These tags or labels may be passive or active. The inter-networking capabilities may be leveraged for tracking locations of physical objects. In many situations, an object may be moved at different points in time, such as a package or equipment moved from a truck to a loading dock to a warehouse, or medical equipment that is moved between different rooms (or floors) in a hospital. In these types of situations, it can be challenging to determine the location of the object with suitable accuracy, including updating of the location as it changes. In addition, systems that use GPS or WiFi may suffer from signal dropout or transmitters going offline, which can reduce the ability to properly identify an object's location.

BRIEF SUMMARY

Aspects of the disclosure provide for enhanced location accuracy of objects via use of anchor beacons within an operational area of a system. Anchor beacons may be placed in different locations in and around rooms, storage areas, loading docks, etc., and their relative or exact location is known. For instance, a given anchor beacon may be placed in one corner of a conference room, and the system may know the corner the anchor beacon is in or may know the room the anchor beacon is placed in. By employing anchor beacons, a system may more easily identify the location of reader devices and asset tracking tags within the system based on the known location of the anchor beacon.

According to one aspect, a method for locating asset tracking tags comprises: detecting, by a reader device, one or more beacon signals from at least one anchor beacon, each of the detected beacon signals including anchor beacon identification information, each of the detected beacon signals being associated with a received signal strength upon receipt at the reader device, the anchor beacon identification information being associated with a physical location of the anchor beacon; estimating, by one or more processors, a position of the reader device according to the received signal strength of the one or more beacon signals and the physical location of the at least one anchor beacon from the anchor beacon identification information; detecting, by the reader device, one or more signals from an asset tracking tag; and identifying, by the one or more processors, a location of the asset tracking tag based on the estimated position of the reader device and signal strength information for each of the one or more detected signals from the asset tracking tag.

Estimating the position of the reader device may include comparing the received signal strength of one of the one or more beacon signals and the physical location of the at least one anchor beacon against stored calibration data. Comparing the received signal strength of one of the one or more beacon signals and the physical location of the at least one anchor beacon against the stored calibration data may include performing a second comparison for another received signal strength from a different anchor beacon. The calibration data may include at least one of environmental information of an operational area or electromagnetic signature information of the operational area.

The method may further include: obtaining, by the reader device, reader environmental information associated with an ambient environment of the reader device and each of the detected beacon signals may further include anchor beacon environmental information associated with an ambient environment of the at least one anchor beacon. Estimating the position of the reader device may include comparing the reader environmental information to the anchor beacon environmental information. The one or more signals from the asset tracking tag may include asset tracking tag environmental information associated with an ambient environment of the asset tracking tag.

Identifying the location of the asset tracking tag is may be further based on the asset tag environmental information and the reader environmental information. Identifying the location of the asset tracking tag may include identifying at least one of a room or a floor in which the asset tracking tag is located. Identifying at least one of a room or a floor of the asset tracking tag may include determining if the asset tag environmental information and the reader environmental information are in agreement.

According to another aspect, a system is configured to locate asset tracking tags. The system comprises at least one anchor beacon; at least one reader device; memory configured to store location information for one or more of the at least one anchor beacon, the at least one reader device, or at least one asset tracking tag. The system also comprises one or more processors operatively coupled to the memory, the one or more processors being configured to: obtain one or more beacon signals from the at least one anchor beacon, each of the obtained beacon signals including anchor beacon identification information, each of the obtained beacon signals being associated with a received signal strength upon receipt at the at least one reader device, the anchor beacon identification information being associated with a physical location of the anchor beacon; estimate a position of the at least one reader device according to the received signal strength of the one or more beacon signals and the physical location of the at least one anchor beacon from the anchor beacon identification information; obtain one or more signals from the at least one asset tracking tag; and identify, by the one or more processors, a location of the at least one asset tracking tag based on the estimated position of the at least one reader device and signal strength information for each of the one or more obtained signals from the at least one asset tracking tag. The at least one anchor beacon may be stationary at the physical location. The one or more processors may be one or more processors of the at least one reader device.

Alternatively or additionally with any of the above, the system may further include a central server and the one or more processors may be one or more processors of the central server. The central server may be configured to transmit at least one of the position of the at least one reader device or the location of the at least one asset tracking tag to a client device. The at least one anchor beacon may be a plurality of anchor beacons, the at least one reader device may be a plurality of reader devices, and the at least one asset tracking tag may be a plurality of asset tracking tags. Each of the plurality of anchor beacons may each be located in a different room or floor within an operational area of the system.

Alternatively or additionally with any of the above, the memory may be further configured to store calibration data, and estimation of the position of the reader device may further include a comparison of the received signal strength of one of the one or more beacon signals and the physical location of the at least one anchor beacon against the stored calibration data. The at least one anchor beacon, the at least one reader device, and the at least one asset tracking tag may be configured to collect environmental information and estimation of the position of the reader device may include a comparison of the environmental information of the at least one reader device to the environmental information of the at least one anchor beacon. The at least one reader device may be stationary or mobile.

BRIEF DESCRIPTION OF THE DRAWINGS

FIG. 5 illustrates an example method in accordance with aspects of the disclosure.

DETAILED DESCRIPTION

Example Systems

Accurate localization of objects can be important for a number of reasons, including knowing where supplies or equipment are stored and whether additional materials need to be ordered. In a warehouse setting, once arriving at the warehouse pallets of goods may be moved to different locations depending on storage limitations, when the goods need to be shipped out, and where the goods are going. In a commercial or hospital setting, equipment may be stored in one location (e.g., a storeroom), placed in different rooms for use, and then moved when the need arises, such as moving a hospital bed from one room to another.

Object localization may be challenging because different storage areas, rooms, floors, etc., may have different wireless transmission properties. This can be affected due to signal reflections (e.g., multipath signals) caused by walls or objects in the area. In addition, there may be noise or interference from wireless signals of other types of communication devices using the same or overlapping signal spectrum.

Figure 1A:
FIG. 1A illustrates various examples for localization of objects in accordance with aspects of the technology.
Figure 1A:
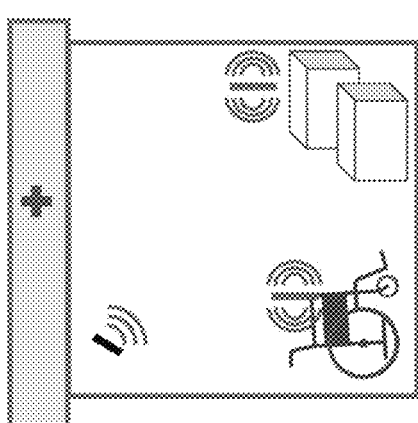
Figure 1A:
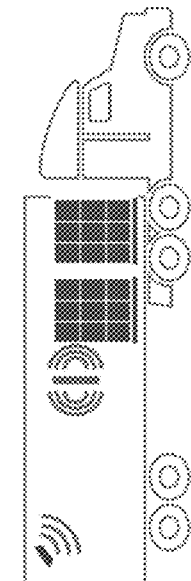
Figure 1A:
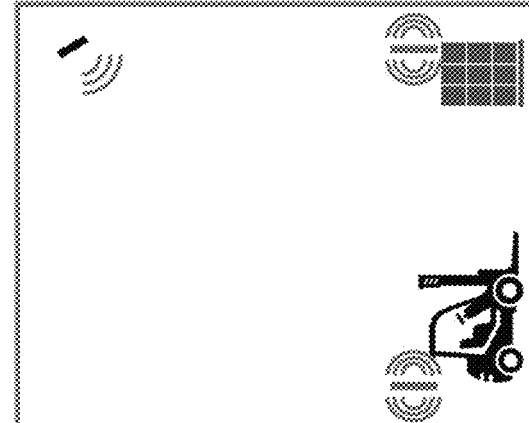

FIG. 1A illustrates examples of different objects in various environments. As shown on the left side image of the figure, there may be packages or equipment on a pallet in a warehouse. The pallet may have come off of a cargo truck as shown by the "In Transit" image in the middle of the figure. The pallet may be moved to one or more different locations within a warehouse, such as by the forklift shown in the left side image. The right side image in the figure illustrates a situation where medical equipment (e.g., a wheelchair) and supplies in boxes may be stored in a supply room in a hospital.

In all of these situations—in the warehouse, on the cargo truck, or at the hospital, the objects of interest may move around. That may be to a different aisle or room in the warehouse, a different room (or even a different floor) of the hospital, or different part of the cargo container of the truck.

In the latter case, the cargo may have shifted during transit or may have been repositioned as different packages were delivered to different locations. Knowing where the objects of interest are currently located, as opposed to where they are presumed to be based on an initial placement, is a valuable piece of information for an office manager, warehouse manager, nurse or orderly to have. Ideally, such people should be able to easily have the current location of a given object presented on their client computing device such as a laptop, mobile phone or smartwatch (or other wearable computing device).

Figure 1B:
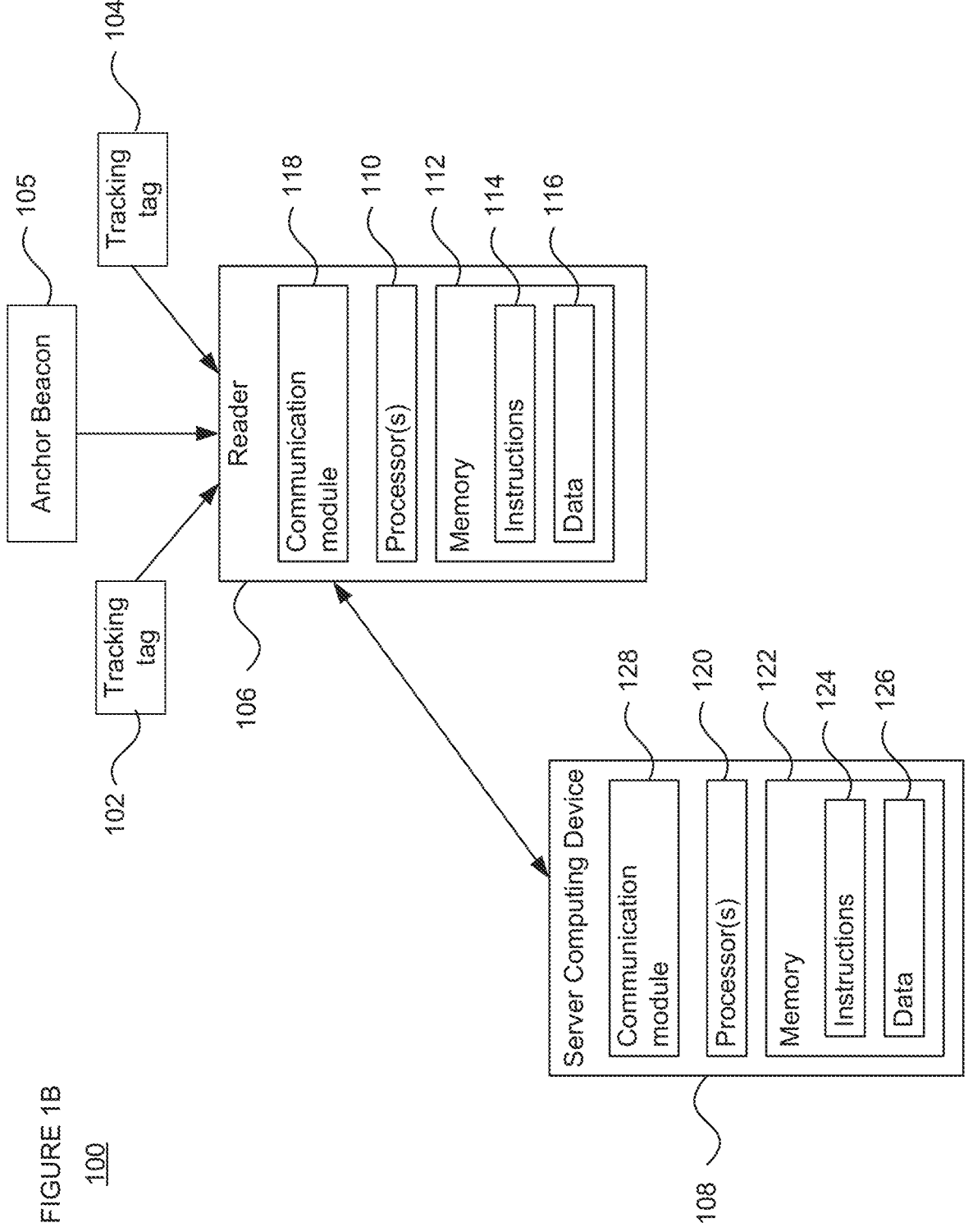
FIG. 1B is a functional diagram of an example tracking system in accordance with aspects of the disclosure.

FIG. 1B is a functional diagram of an example tracking system 100. The tracking system 100 may include a plurality of tracking devices, such as tracking tags 102 and 104, one or more anchor beacons 105 and a reader 106. As discussed further below, a server computing device 108 may also be part of the tracking system 100. Each tracking tag may include one or more sensors, an identifier chip (such as for radio frequency (RF) identification), and/or a transmitting device (such as an RF module configured to transmit information using a selected frequency band and transmission protocol). A tracking tag may be passive, such as a tag configured to activate or be powered by environmental energy, or active, such as a tag configured to include a battery or be coupled to another power source. A given tracking tag may be placed on or otherwise attached to or inserted into an item to be tracked, like a package, a piece of equipment, a vehicle, a warehouse section, a room, etc. While tracking tags 102 may be associated with assets such as packages, equipment, or vehicles (e.g., a forklift or an autonomous fulfillment robot that can retrieve packages from different locations in a warehouse), tracking tags 104 may be beacon tags configured to transmit beacon information from an aisle in a warehouse or from a specific room in a hospital. Different customers may have varying accuracy and "liveliness" needs. For instance, one customer may only want to know aisle-level accuracy every day (e.g., before a warehouse closes for the evening), while another customer such as a hospital nurse may need to know which room a piece of equipment is in every hour so that it can be accessed should a patient need it.

The given asset tracking tag 102 or beacon tracking tag 104 may emit a signal via an antenna, such as using the transmitting device, to communicate data. The data may be formatted according to the selected protocol and include one or more sensed characteristics of the given tracking tag or its environment. For example, the sensed characteristic may be a temperature, a location, motion, battery conditions, trip/item conditions, and/or other detectable characteristics of the tracking devices or its environment. The transmitting device may send such information via radio frequency transmission in a selected frequency band, using a standard or proprietary protocol. By way of example, the transmitting device may employ a Bluetooth™ (e.g., a Bluetooth Low Energy (BLE)) or 802.11 protocol in the 2.4 GHz and/or 5 GHz frequency bands. In some examples, each anchor beacon and each asset tracking tag uses the Bluetooth™ or BLE protocol.

The one or more anchor beacons 105 are present at a fixed and known physical location within an operational range of the system, such as within the geographic area of warehouse, office building or office park, hospital complex, etc. For instance, when each anchor beacon 105 is set up, its physical location (e.g., room 301 on the third floor of a hospital, or bin 22 on shelf 3 in aisle 26 of a warehouse) is recorded and stored in a spreadsheet or other database in memory of the system. The anchor beacon(s) may emit a signal via an antenna, such as using the transmitting device, to communicate data. The data may be formatted according to the selected protocol and include one or more sensed characteristics of the given anchor beacon or its environment. For example, the sensed characteristic may be a temperature, a location, motion, battery conditions, trip/item conditions, and/or other detectable characteristics of the anchor beacons or its ambient environment (e.g., the environment of the room or position in a warehouse in which the anchor beacon is located). The transmitting device may send such information via radio frequency transmission in a selected frequency band, using a standard or proprietary protocol. By way of example, the transmitting device may employ a Bluetooth™ (e.g., a Bluetooth Low Energy (BLE)) or 802.11 protocol in the 2.4 GHz and/or 5 GHz frequency bands. In some examples, each anchor beacon uses the Bluetooth™ or BLE protocol.

The reader 106 may be a computing device configured to detect the signals emitted by the plurality of tracking tags 102 and 104 and the one or more anchor beacons 105, then store and/or transmit data related to the tracking tags. While only one reader is shown in FIG. 1B, the system may employ multiple readers. The reader 106 may include one or more processors 110, memory 112 and other components typically present in general purpose computing devices. The reader 106 includes a communication module 118 having an antenna and a processing section (not shown), which may include a bandpass filter for the frequency band of interest, an analog to digital (A/D) converter, and a signal processing module to evaluate information in received signals. The processing section may also convert the received signal to a baseband signal, before or after A/D conversion. The communication module 118 may include separate receiver and transmitter submodules, or an integrated transceiver configured to receive signals from the tracking tags 102, 104 and/or the anchor beacons 105 in accordance with the protocols used by those devices. The communication module 118 may also be configured for communication with the server computing device 108. The reader 106 may be stationary or mobile (e.g., on a hospital cart or on a mobile device of an employee).

The one or more processors 110 may be commercially available CPUs or microcontrollers. Alternatively, the one or more processors may be a dedicated device such as an ASIC or other hardware-based processor, such as a field programmable gate array (FPGA). Although FIG. 1B functionally illustrates the processor(s), memory, and other elements of the reader 106 as being within the same block, the processor, computing device, or memory may actually include multiple processors, computing devices, or memories that may or may not be stored within the same physical housing. For example, memory may be a hard drive, a removable USB drive or other storage media located in a housing different from that of the reader 106. Accordingly, references to a processor or computing device will be understood to include references to a collection of processors or computing devices or memories that may or may not operate in parallel.

The memory 112 stores information accessible by the one or more processors 110, including instructions 114 and data 116 that may be executed or otherwise used by the processor(s) 110. The data may include sensed characteristics from any of the tags 102 and/or 104 received by the reader 106. The memory 112 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored, or modified by processor(s) 110 in accordance with the instructions 114. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 114 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods, and routines of the instructions are explained in more detail below.

In some implementations, the tracking system 100 may further include a central server, such as one or more server computing devices 108 accessible by the one or more processors 110 of the reader 106. In some implementations, one or more tracking devices in the tracking system 100, such as a tracking tag 104 and an anchor beacon 105, may be configured to obtain and communicate data directly to the server computing devices 108. The server computing devices 108 may include one or more processors 120, memory 122 and other components typically present in general purpose computing devices. The one or more processors 120 may be the same or similar type as the one or more processors 110, and the memory 122 may be the same or similar type as the memory 112. The memory 122 stores information accessible by the one or more processors 120, including instructions 124 and data 126 that may be executed or otherwise used by the processor(s) 120. Data 126 and instructions 124 may be the same or similar type as the data 116 and instructions 114, respectively. The server computing device(s) includes a communication module 128, which may be configured for communication with the communication module 118 of one or more readers 106, as well as communication with anchor beacons 105 and/or tracking tags 104, in accordance with the protocols used by those devices. As with communication module 118, the communication module 128 may include separate receiver and transmitter submodules, or an integrated transceiver.

After detecting the signals of one or more tracking tags 102 or 104, and one or more anchor beacons 105, the reader 106 may use communication module 118 transmit the data from the tracking tags and the anchor beacons to the server computing device 108 through an existing connection or through a network. The data may be received in a series of payloads (e.g., data packets) either continually, at one or more set intervals, or ad hoc whenever the tracking tags transmit. Thus, when there are multiple tracking tags and/or anchor beacons, the data is effectively received as a plurality of separate data streams. A given payload (which may comprise one or more data packets) may include measurements taken at one or more time intervals, each of which may have a corresponding timestamp. In one scenario, the reader 106 may include a transceiver including both a receiver and a transmitter, which is configured to receive signals from the tags 102 and 104 and the anchor beacon 105 and also to send and receive information with the server computing device 108.

The server computing devices 108 may be configured to track characteristics of the tracking tags for one or more alerts based on a plurality of conditions. The plurality of conditions may include at least one condition for each characteristic, such as a minimum, a maximum, a threshold, a duration, and/or a geofence. The conditions may be predetermined or set based on user input. For example, a first alert may be set for when (1) a temperature is greater than a threshold temperature, e.g., 0° C. to 10° C. for 30 minutes and (2) the tracking device is on a trip, which may indicate overheating of a cooled package or storage compartment. A second alert may be set for when (1) no motion is detected for 10 minutes, (2) 2 of 3 locations are in a geofence, and (3) the tracking device is on a trip, which may indicate that a package is out for delivery. A third alert may be set for when (1) a threshold amount of light is detected from inside a package and (2) the tracking device is on a trip, which may indicate unexpected opening of the package or tampering. A fourth alert may be set for when (1) a threshold amount of light is detected from inside a package and (2) 2 of 3 locations are in a destination geofence, which may indicate opening of the package after delivery or receipt. Many other alert conditions and tracking scenarios are possible, and the above examples are not intended to be limiting.

The tracking system 100 may optionally include an application that may be installed on one or more client computing devices. Using the application, the client computing devices may access the data from the reader 106 and/or the central server 108 through a network and the corresponding communication modules of the reader and/or central server.

Figure 2:
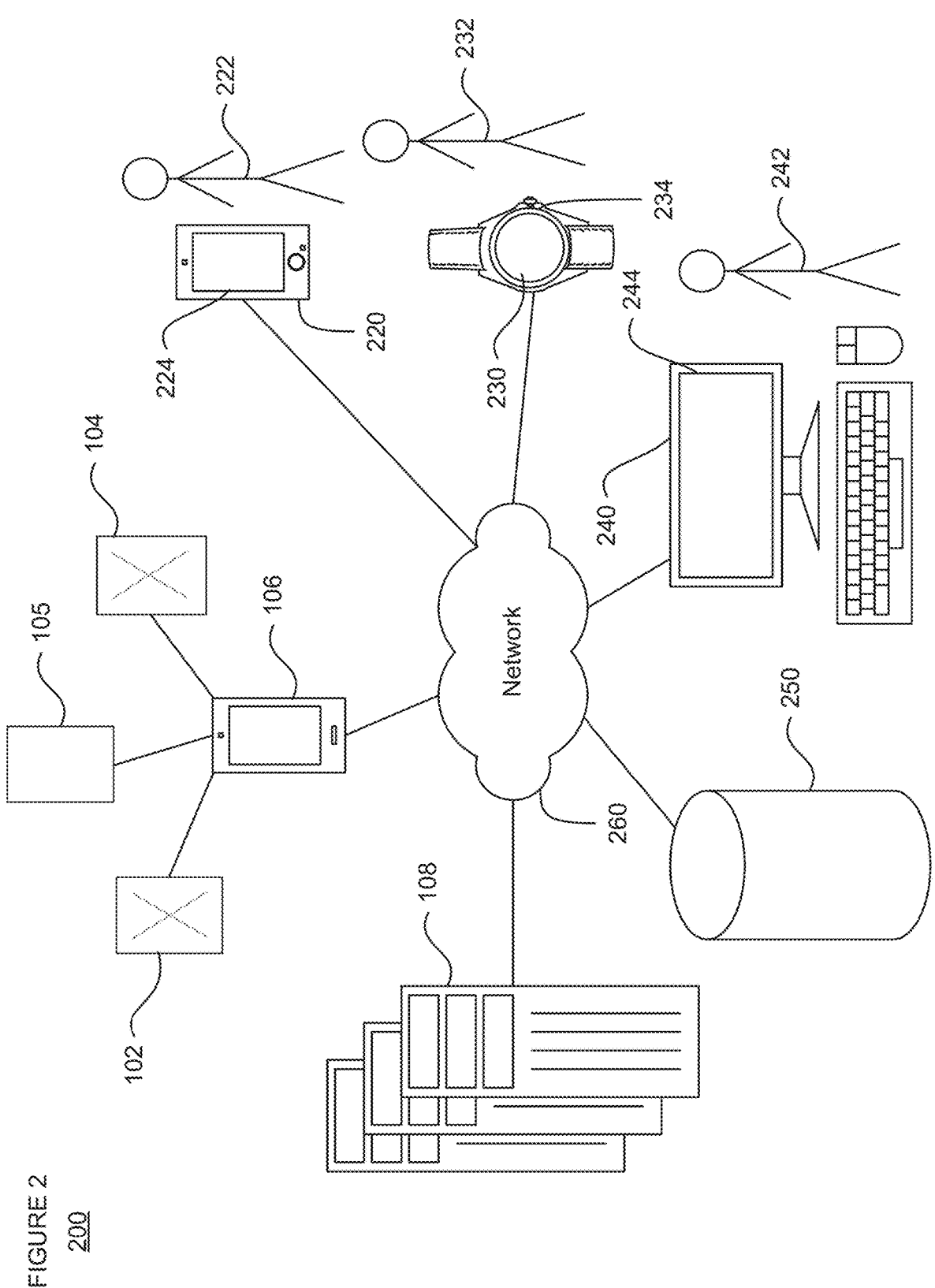
FIG. 2 is a pictorial diagram of an example network in accordance with aspects of the disclosure.
Figure 3:
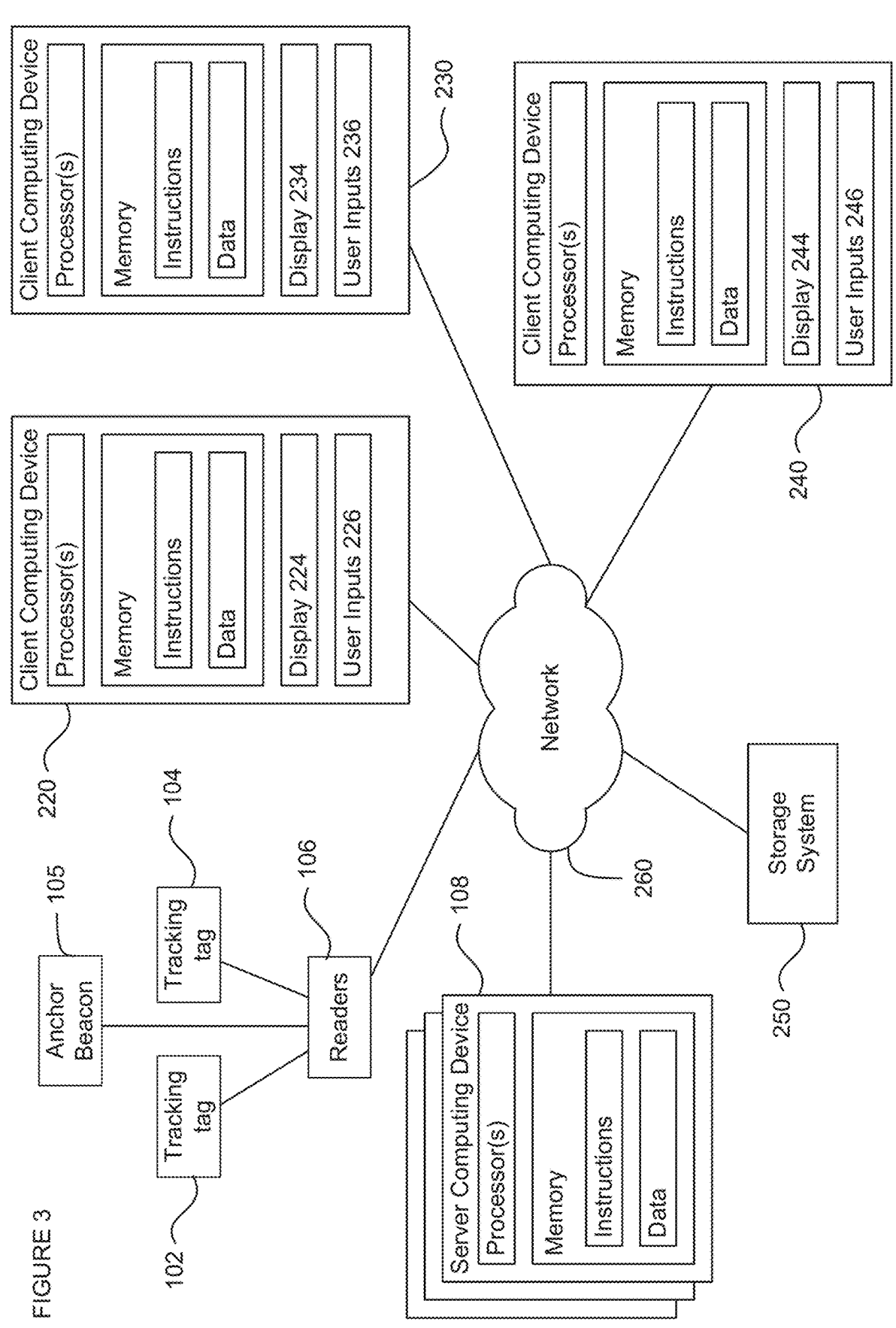
FIG. 3 is a functional diagram of the example network in FIG. 2 in accordance with aspects of the disclosure.

FIGS. 2 and 3 are pictorial and functional diagrams, respectively, of an example system 200 that includes a plurality of client computing devices 220, 230, 240 and a storage system 250 connected via a network 260. System 200 also includes tracking system 100, including tracking tags 102, 104, anchor beacon 105, and reader 106, and server computing device 108. Although only a few tags, anchor beacons, and computing devices are depicted for simplicity, a typical system may include significantly more.

Using the client computing devices, users, such as user 222, 232, or 242, may view the location data on a display, such as displays 224, 234, 244 of respective computing devices 220, 230, 240. As shown in FIG. 3, each client computing device 220, 230, 240 may be a personal computing device intended for use by a respective user and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a head-mounted display, a smartwatch display, a projector, a television, or other device that is operable to display information), and user input devices 226, 236, 246 (e.g., one or more of a mouse, keyboard, touch screen and/or a microphone). The client computing devices may also include speakers, a network interface device, and all of the components used for connecting these elements to one another.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system (e.g., a smartwatch or head-mounted display, or a netbook that is capable of obtaining information via the Internet or other networks. As an example, the user may input information using a small keyboard, a keypad, microphone, using visual signals (gestures) with a camera or other sensor, or a touch screen.

Figure 4A:
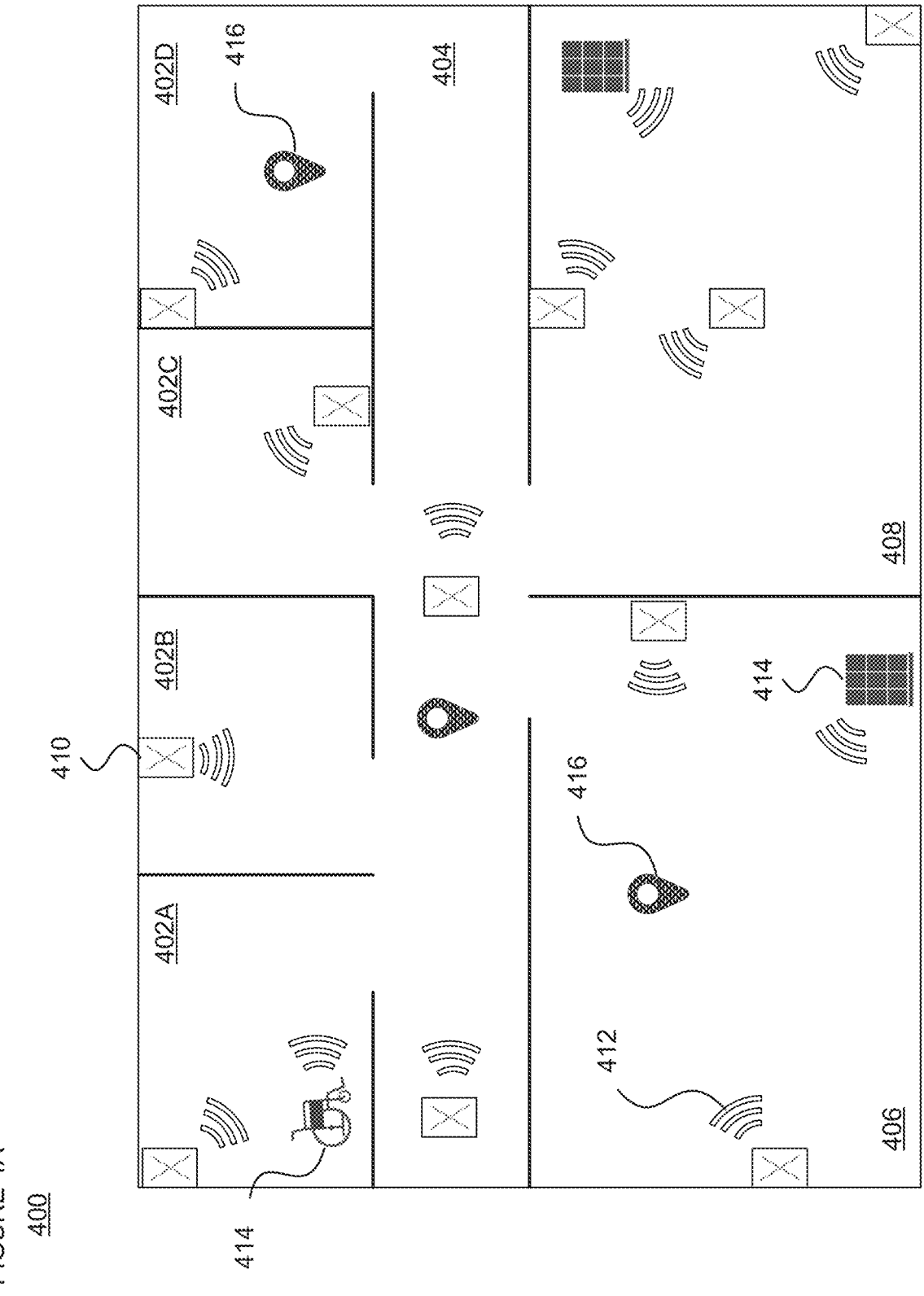
FIGS. 4A-B illustrate example scenarios in accordance with aspects of the disclosure.

FIG. 4A illustrates one example 400 of a system having a number of tracking tags arranged in various locations of a building (e.g., a hospital). In this example, there may be a number of rooms 402, such as patient rooms, along one side of a hallway 404. On the opposite side of the hallway 404 there is a storage room 406, such as to house equipment or supplies, as well as another room 408, which may be a meeting room, common area, rehab facility or the like. One or more anchor beacons 410 may be located in each room, including the hallway. Each anchor beacon 410 is configured to emit beacon signals 412 (e.g., RF signals in a selected frequency band according to a particular communication protocol). By way of example, the beacon signals 412 may be Bluetooth™ or BLE signals that are transmitted periodically, such as every few seconds, every few minutes, or more or less frequently. Alternatively, the signals may be transmitted when a particular condition or event has occurred (such as detection that a threshold temperature and/or humidity has been reached, or upon detection of signals from one or more reader devices). While the beacon signals 412 may appear directional, this need not be the case and the signals may be transmitted omnidirectionally, for instance from an anchor beacon 410 that is located on the ceiling, pillar, or floor. In some implementations, the anchor beacons 410 may be configured to emit RF signals with information associated with its environment (e.g., temperature, humidity, etc.).

In addition to anchor beacons 410, there may be asset tags 414 on a variety of items (e.g., a case of supplies as shown in storage room 406 or a wheelchair shown in room 402A). Each asset is also configured to emit RF signals with information associated with that asset (e.g., temperature, motion information, item details, and/or other detectable characteristics of the tracking device or its environment) in the manner described above. Readers 416 may be found at various locations in the building, such as in a patient room, the storage room, the hallway, or other location. Note that even if transmitted omnidirectionally, the signals from a given anchor beacon or an asset tag may be attenuated in a non-uniform manner due to the presence of obstacles such as walls, furniture, floors/ceilings, equipment, etc.

Figure 4B:
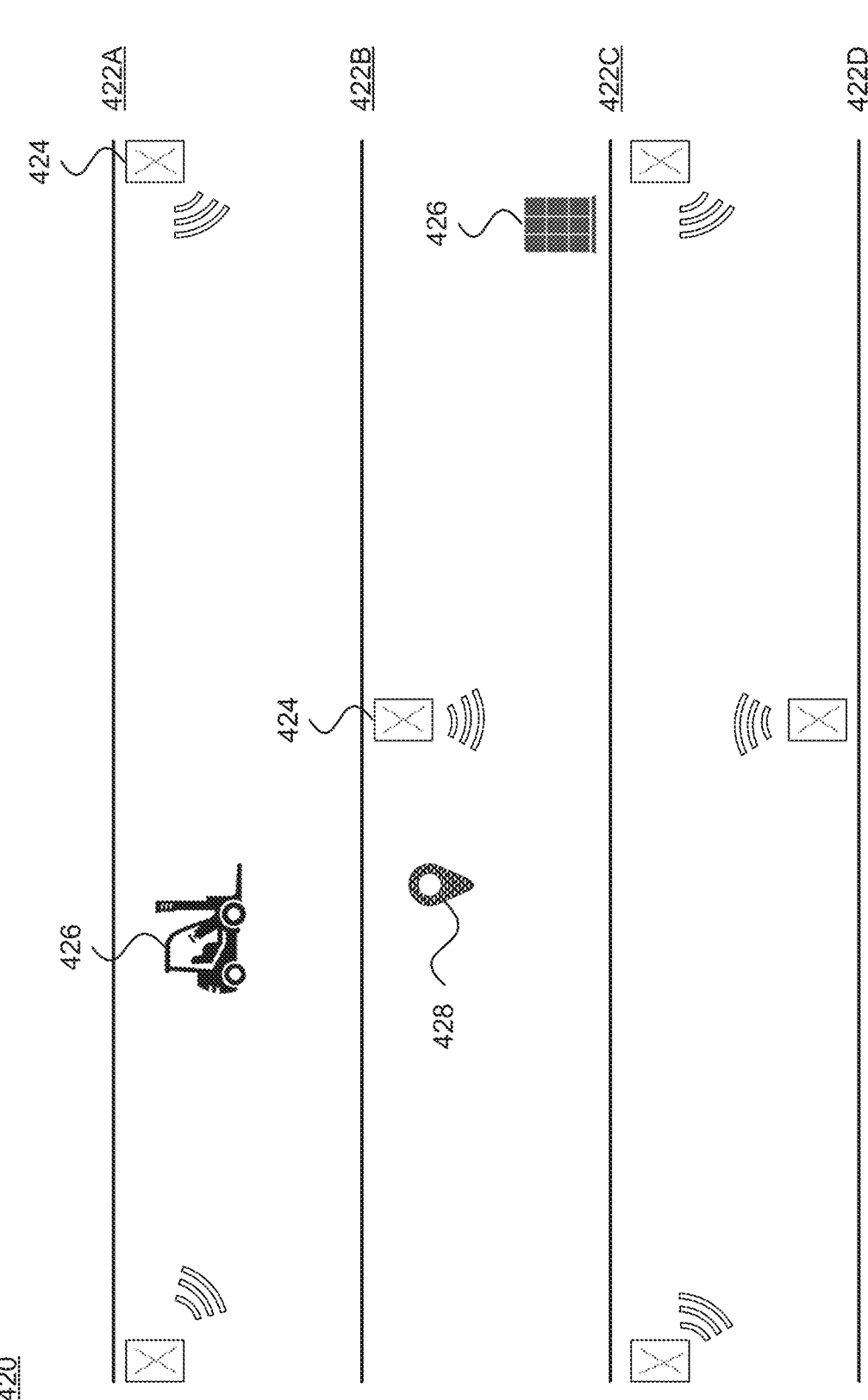

FIG. 4B illustrates another example 420 of a system having a number of anchor beacons positioned along different aisles in a warehouse setting. In this example, there are a number of aisles 422A-422D, although there may be more (or fewer) aisles, and the aisles may be arranged in other configurations than what is shown. Here, anchor beacons 424 are located at different places for the aisles, such as along aisle endcaps, along the ceiling (or floor), on shelves, storage lockers, cabinets or other places along the aisle, etc. Similar to FIG. 4A, tracking tags 426 are placed on or otherwise associated with different assets, such as a pallet of equipment or a forklift that retries items from their locations in the warehouse. As above, the anchor beacons and the asset tracking tags are configured to transmit signals that are detectable by one or more readers 428.

Example Methods

In addition to the aspects described above and illustrated in the figures, various operations will now be described. It should be understood that the following operations do not have to be performed in the precise order described below.

According to one aspect of the technology, a system is configured to determine the location of items having tracking tags (e.g., tags 102 as shown in FIG. 1B). In order to track the items, the system may require the location of the tracking tags on each item, on a package containing multiple items, a pallet storing a number of packages, etc. As discussed herein, the system makes a location determination using beacon transmissions received from one or more tracking tags 104 and one or more anchor beacons 105, which are detected by one or more readers 106. Since the locations of the anchor beacons 105 are fixed and known within the system, the reader 106 or the server computing device 108 may utilize the anchor beacons for location determination. In implementations when the reader 106 is mobile, the location for a reader can be determined based on the transmissions from one or more of the anchor beacons 105. Then, knowing the location of the reader, the system can readily identify where different assets are located via signals received by the reader from corresponding asset tracking tags. This may take place in an indoor environment, such as a warehouse, in a trailer of a cargo truck, in a room of a hospital, etc. However, in other situations the detection may occur outdoors or in partly enclosed structures.

In one example, each beacon tracking tag 104 and anchor beacon 105 transmits a beacon signal or information signal at regular or defined intervals. The intervals may be every few seconds, every few minutes, or more or less. The beacon signal transmissions may be received by one or more readers 106 of the system. The readers may be stationary or mobile. The tracking tag transmissions include data such as a tracking tag identifier or other identification information and the strength of the signal upon transmission by the tracking tag (e.g., the initial signal strength or transmit power). The identifier or other identification information is specific to each tracking tag (such as a unique equipment serial number (ESN) or mobile equipment identifier (MEID) number), allowing for identification of each individual tracking tag within the system. Similarly, the anchor beacon transmission includes data such as an anchor beacon identifier or identification information and the strength of the signal upon transmission by the anchor beacon (e.g., the initial signal strength or transmit power). The identifier or identification information is specific to each anchor beacon (e.g., an ESN or MEID number), allowing for identification of each individual anchor beacon within the system. Additionally, since the location of the anchor beacon within the system is fixed and known, the identifier or identification information allows the system to identify the location of the anchor beacon associated with each anchor beacon transmission.

Upon receipt of a beacon signal transmission from a tracking tag or anchor beacon, a reader may timestamp the signal (as the transmissions of the beacons, e.g., one or more data packets, may not include any transmission timestamps) and detect a received signal strength. The timestamp corresponds to the time the signal was received at the reader and the received signal strength is the power level of the signal when received at the reader. In one scenario, the reader may process the information locally, although in other scenarios the reader conveys the signal information to another device, such as a central server. The reader transmission includes data such as the identifier associated with the tracking tag or anchor beacon that sent each beacon, the initial signal strength, the timestamp, and the detected received signal strength from transmissions received from both anchor beacons and tracking tags. The reader may also transmit an identifier or other identification information associated with the reader. The reader may record an estimate of its own location when the signal is received. Alternatively or additionally, other environmental information may be recorded upon receipt of the signal from the tracking tag (e.g., temperature, humidity or changes thereto) can be recorded. The environmental information taken pertains to conditions from the ambient or surrounding environment of the reader (e.g., environment of the room or portion of a warehouse in which the reader is currently located). All of this information may be sent to the central server. In some implementations, the reader is stationary and may or may not record or send this additional information (e.g., estimate of its own location, environmental information from its ambient environment).

The central server processes the data from the reader to first make a location determination for the reader (or the reader may process the data locally). In one implementation, the central server may do this by, for example, calculating a distance between the anchor beacon and the reader based on the received signal strength (and/or the difference between the received signal strength relative to its initial signal strength) over at least one timestep, where the distance is a function of the received signal strength. The central server may utilize data containing the same beacon tracking tag identifier (i.e., corresponding to the same tracking tag and/or associated item) from multiple readers. The central server may repeat the distance calculation for the received signal strength over at least one timestamp received from the multiple readers. The central server may then make a location determination based on the calculated relative distances between each reader and the beacon tracking tag.

In another implementation, the central server may make a location determination of the reader based on a comparison of the received signal strength to calibration data. Calibration data contains previously calculated, estimated received signal strength values that correspond to locations within the operational range of the system with respect to the one or more anchor beacons of the system. The estimated received signal values may be determined by, for example, calculating an estimated received signal strength value based on a distance between an anchor beacon and a location, where the estimated received signal strength value is a function of distance and the anchor beacon location is known. Additionally, the calibration data may include, and account for, environmental information (e.g., temperature, humidity, etc.) and a map of the operational area of the system. The calibration data can be used to simulate different types of environments in order to estimate what the signal strengths would be in each room. In some implementations, the central server may account for environmental information by comparing the information received from a tracking tag, reader, or both to known environmental conditions in an operational area of the system and determine locations within the operational area of the system where the received information agrees with the known conditions. The system may assign a higher probability (e.g., increase the probability value) that the tag and or reader is in a determined location based on the agreement of environmental conditions. Such a determination may additionally be used in a room or floor location determination discussed in more detail below.

In some implementations, additional system calibration may be conducted within the operational range of the system. For example, mobile readers and asset tracking tags may be moved throughout the operational range and communicate with stationary anchor beacons and readers allowing for fine-tuning of the calibration data. In one example, calibration within the operational range may allow the calibration data to account for objects and barriers within the system (e.g., floors, walls, windows and/or objects within a room). In another example, the calibration within the operational range allows for the measurement of electromagnetic (EM) signatures of different locations. The EM signature of a location may cause a received beacon signal to differ from a previously estimated signal strength contained in the calibration data. A calibration done within the operational range allows the calibration data to account for and be updated with the EM signatures present within the operational range. Such a calibration is particularly advantageous in locations with stationary or regularly present equipment that produces EM radiation. For example, in a hospital setting equipment adapted to take a computed tomography (CT) scan may produce a significant amount of EM radiation while in use. Similarly, devices used in radiation oncology facilities such as linear accelerators and remote afterloaders may also produce EM radiation affecting a received signal strength. In some implementations, such calibration may occur both when equipment is and is not being operated.

After receiving data from a first reader containing a first received signal strength from a given anchor beacon, the central server can compare the first received signal strength to the calibration data. Based on the comparison, the central server determines the distance between the first reader and the given anchor beacon at a first timestamp. The central server may repeat the comparison for a second received signal strength from a second anchor beacon at the first timestamp corresponding to the same reader. The central server may repeat the comparison with additional received signal strengths from additional anchor beacons at the first timestamp corresponding to the same reader, such as according to a multi-lateration process. For example, a multi-lateration process may include location specific information such as a sitemap, including for example obstacle and anchor beacon locations, and characteristics regarding individual rooms contained in the sitemap. The characteristics may include measured values such as temperature. In some situations, the multi-lateration process may utilize the probabilistic approach described in more detail below. The central server may then make a location determination with increased precision based on the comparison between each anchor beacon and the reader. The comparison may be repeated at additional timestamps.

In one aspect, the system may approximately estimate a log likelihood of a given reader being in each "cell" of a grid that can be virtually imposed on the location (e.g., one floor of a building). This may employ a Bayes-style approach, based on a linear mapping of received signal strength to distance. Refinement can be via location filtering so that a beacon's location is probabilistically related to its previous estimated positions (e.g., using a Kalman filter). This enables enhanced location determination of the readers and, ultimately, tracking tags associated with various other objects (assets).

In another aspect, beacon-reader calibration allows the system to build a probabilistic model around the error tolerances of noisy received signal strength readings (from beacon to reader). Receiver filtering can be performed, which allows the system to combat noisy signals by dynamically weighting/removing readings that are outside expected ranges. Then an iterative Gauss Newton method for nonlinear least squares (NLLS) can be used to find the optimal location prediction as a function of the remaining readings from the reader(s).

In this approach, a Bayesian estimation can be performed, using a priori information about the devices based on manufacturer tolerances, where the likelihood is identified via data collected offsite. The Bayesian estimation may also incorporate and account for possible transmissions through walls, floors and other barriers likely to be present in the operation range of the system. Information regarding such barriers may be used in the estimation. This results in a posterior distribution (e.g., p(distance|observed rssi) for noisy received signal strength (RSSI) readings versus distance per receiver (reader). Receiver (reader) dynamic filtering can involve median-mean filtering across a time window for each reader-anchor beacon pair to filter out noisy values. It can also include thresholding for known/acceptable anchor beacon-reader distance measurements. For example, each time an inference is run, the system can filter out distance measurements that are unrealistic and/or have changed widely in time (e.g., a change of 100 meters in 0.5 seconds from one measurement to the next). This may provide another layer of robustness against noise (e.g., due to temporary moving forklifts, humans walking around with electronics, etc.).

The NLLS approach can be framed as an optimization task, where the system seeks to minimize the error across all observed data points. For instance:

$$\|\in\|^2 = \Sigma_n (\text{rssi\_distance} - \|\overrightarrow{x} - \overline{\overline{\text{anchorbeacon}}}\|)^2 \tag{1}$$

where rssi_distance is the noisy distance from the reader to the anchor beacon, $\overline{\overline{\text{anchorbeacon}}}$ are the static (known) coordinates of the anchor beacon (or other receiver during testing), and $\overrightarrow{x}$ are the unknown reader coordinates. The system finds the x that minimizes the above error. The problem can be linearized so that the Gauss Newton iterative method can be employed via a Taylor Series expansion on the error term. The process can be iterated until convergence is reached (e.g., the norm of difference between successive estimates of x is below a selected threshold) or the maximum number of iterations is reached. The maximum number of iterations can be selected according to a tradeoff between liveliness versus accuracy per client needs (e.g., room-level accuracy versus aisle or shelf-level accuracy).

According to one aspect, location tracking can be performed as follows. In a single prediction window (e.g., between 1-20 minutes), if the number of packets received for a single transmission rate (e.g., packets per transmission) is less than threshold such as a minimum sample count (the minimum number of packets received in order to perform the evaluation, such as at least 3-7 packets), then the received signal strength values for that transmission rate are ignored. If it is more than the minimum sample count, the system aggregates RSSI values using an aggregation function to generate a single smooth RSSI value. The aggregation function may be, e.g., a MAX function that returns a largest value from the set of RSSI values.

One algorithm includes the following operations. First, fetch data corresponding to a given prediction window for a single beacon. Then aggregate RSSI values for each transmission rate separately using the approach described above. Then use the aggregated RSSI values to obtain a distance estimate of a given reader to each anchor beacon. Then get an initial estimate of the reader position by a grid search process using the distance estimates (see below). The initial estimate can then be fed into an NLLS method as a starting estimate. The NLLS method uses this initial estimate and the distance estimates to further optimize reader position prediction.

The distance estimation can be done according to a machine learning algorithm, in which the goal is to estimate the distance of the beacon from each reader using RSSI values for different transmission rates. For each transmission rate, a separate regression algorithm is trained. For example, for tx=−20, a regression model may be trained using RSSI values for tx=−20 transmission rate, where the RSSI values are the predictor variable and the distance is the target variable. This approach considers the priority of transmission rates. For instance, the following is one example priority order: −20>−16>−12>−8>−4>0>2>4. The above priority order indicates that the regression model for tx=−20 is preferred over the regression model for tx=−16 and so on. The rationale for such a priority order is that the spread of RSSI for tx=−20 for a given distance interval may be narrower compared to the RSSI for tx=4. In a given prediction window, distance can be estimated using only one regression model for a single tx. The regression model can be chosen based on the priority described above. Thus, in a given prediction window, if one were able to get an aggregated RSSI value for tx=−20, the regression model for tx=−20 will be used for making a prediction, otherwise the system tries to use the regression model for tx=−16 and then so on.

Once the system has estimates of distances from readers to anchor beacons, the next stage is to find a point in continuous space which best fits those distance estimates. For a grid search, the system may divide the 3D space into 1 meter×1 meter×1 meter cubes (or larger or smaller cubes) based on the dimensions of the location of interest. Each cube is represented by its centroid and the error for each cube is calculated using equation (1) as set forth above.

Finally, once the locations of different readers are determined, those locations can be stored in a database such as database 250 of FIG. 2. As readers and the central server obtain more recent information (e.g., received data packets from anchor beacons), the locations of readers in the database can be updated accordingly. In some instances, when a reader is first placed at a location, a user may enter its location information XY coordinates relative to the building's origin and height relative to the floor the reader is on. Such XY coordinates may be converted to latitude/longitude (with or without height or other elevation information such as the floor or level).

Following the determination of the reader location, the central server may then make a location determination for the tracking tag that sent a message (or the reader may process the data locally). The central server may make this determination in the same manner described above in the determination of the reader location, with the addition of the known reader location. For example, the central server may make a location determination of the tracking tag based on a comparison of the received signal strength to calibration data. Following the determination of the reader location, the calibration data is updated with the reader location such that the calibration data may now be used in the determination of the location of the tracking tag. The updated calibration data contains estimated received signal strength values that correspond to locations within the operational range of the system with respect to the one or more anchor beacons of the system and the reader(s) whose locations were previously determined at the given timestep. The estimated received signal values may be determined by, for example, calculating an estimated received signal strength value based on a distance between the reader and a location, where the estimated received signal strength value is a function of distance and the reader location is known. Additionally, the calibration data includes, and accounts for, information such as temperature, humidity, and a map of the operational area of the system.

After receiving data from a first reader containing a first received signal strength from the tracking tag, the central server can compare the first received signal strength to the calibration data. Based on the comparison, the central server determines the distance between the tracking tag and the reader at a first timestamp. The central server may repeat the comparison for a second received signal strength from a second reader whose location has been determined at the first timestamp corresponding to the same reader. The central server may repeat the comparison with additional received signal strengths from additional readers whose location have been determined at the first timestamp corresponding to the same tracking tag, such as according to the multi-lateration process detailed above. The central server may also implement the Bayes-style approach including the probabilistic model, NLLS method, etc. detailed above in the location determination of the tracking tag.

In some implementations, the tracking tag location determination may only need to be room and/or floor specific. The granularity may be determined based on different factors, including a selection by a customer, types of goods or products being tracked, information about the location itself, etc. In such an implementation, the central server need only determine if the received signal strength is above a threshold value. The threshold value is determined as a function of signal attenuation where the threshold represents the lowest possible received signal value for a beacon within a room of a particular floor. This room and/or floor specific determination may be utilized in the reader location determination as well. For example, if a reader receives a beacon signal from a tracking tag or an anchor beacon whose received signal strength is below the threshold value, the central server will determine the reader is not in the same room and/or floor as the anchor beacon or tracking tag. Conversely, if the received signal strength is above the threshold value, the central server will determine the reader is in the same room and/or floor as the anchor beacon or tracking tag. When the signal corresponds to the anchor beacon, whose room and floor location is known, the central server may determine the room and floor location of the reader based on the comparison of the received signal strength to the threshold value. Once the central server determines the room and floor location of the reader, the central server may determine the room and floor location of a tracking tag in the same manner. This determination may be repeated for multiple readers and tracking tags of the system.

Moreover, this room and/or floor determination may be used alone or in conjunction with the location determination described above. In an implementation where the room and/or floor determination is used in conjunction with the location determination above, it may be utilized to further filter unlikely locations. For example, if a reader or tracking tag is determined to be in a particular room or floor, the central server may update the calibration data to reflect such a determination (e.g., assign a high probability, 80-95% or higher, that the reader or tag is in a particular room) and allow for a more precise location determination. In some implementations, the determination of if the tracking tag and reader are in the same room, on the same floor, or both may include a comparison of environmental information. For example, the central server may compare environmental information received from a tracking tag, reader, or both to known environmental conditions in an operational area of the system or to environmental conditions detected by a stationary anchor beacon and determine locations within the operational area of the system where the received information agrees with the known conditions. The system may assign a higher probability (e.g., increase the probability) that the tag and or reader is in a determined location based on the agreement of environmental conditions. For example, if the environmental conditions detected by a tracking tag agree with a first reader but disagree with a second reader the central server may determine that the tracking tag is not in the same room or floor as the second reader and increase the probability that the tracking tag is in the same room or floor as the first reader. For instance, the conditions may be determined to agree when their values are within about 5%-15% of one another or, for temperature, within 2°-4° of one another. According to another example, agreement for a given condition may be determined if the difference between the values is below a threshold difference associated with that condition. The same process may apply with a reader and a first and second anchor beacons. This determination is particularly advantageous in an operational system with temperature-controlled portions (e.g., refrigerated trucks, food storage facilities).

In some implementations, the central server may use proximity data in a location determination, including the determination of whether the tracking tag and a reader are in the same room, on the same floor, or both. Proximity data may be generated by a reader or tracking tag interacting with a device, mobile or stationary, known to be in a particular room or floor (e.g., laptop, desktop, stationary medical device, etc.). The proximity data may be generated when the tracking tag or reader is within a certain distance of the device (e.g., 1-4 meters, or more or less). In some implementations, the proximity data might be generated as a result of the interaction of one or more ultrasonic speakers and one or more microphones of the tracking tag and/or the reader with one or more ultrasonic speakers and one or more microphones of the device. The ultrasonic speakers and microphones may be limited in range to a particular room as the ultrasonic waves are significantly attenuated but walls and/or floors of a room, allowing verification of position within the same room and floor of the tracking tag and/or reader to the device In some implementations, proximity data may be used in conjunction with the approaches described above. For example, if, based on the proximity data, a tracking tag or reader is determined to be in a particular room and/or floor, the multi-lateration approach is updated with the determination and limits its computational area to the particular room and/or floor. In one situation, if a partial multi-lateration was done that suggested that a signal should be present at a room in which there is no signal, then either the target object is actually at another location or there is an obstacle in the room preventing detection of the target object. If other targets are found in this situation, then a likelihood that the target object is in that room may be reduced.

In view of the above, FIG. 5 illustrates an exemplary method 500 for locating asset tracking tags. At block 502, the method includes detecting, by a reader device, one or more beacon signals from at least one anchor beacon, each of the detected beacon signals including anchor beacon identification information, each of the detected beacon signals being associated with a received signal strength upon receipt at the reader device. The anchor beacon identification information being associated with a physical location of the anchor beacon. At block 504, the method includes estimating, by one or more processors, a position of the reader device according to the received signal strength of the one or more beacon signals and the physical location of the at least one anchor beacon from the anchor beacon identification information. At block 506, the method includes detecting, by the reader device, one or more signals from an asset tracking tag. And at block 508, the method includes identifying, by the one or more processors, a location of the asset tracking tag based on the estimated position of the reader device and signal strength information for each of the one or more detected signals from the asset tracking tag.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for locating asset tracking tags, the method comprising:

detecting, by a reader device, one or more beacon signals from at least one anchor beacon, each of the detected beacon signals including anchor beacon identification information, each of the detected beacon signals being associated with a received signal strength upon receipt at the reader device, the anchor beacon identification information being associated with a physical location of the anchor beacon;

estimating, by one or more processors, a position of the reader device according to the received signal strength of the one or more beacon signals and the physical location of the at least one anchor beacon from the anchor beacon identification information, wherein the estimating includes comparing environmental information of the reader device associated with an ambient environment of the reader device to environmental information of the anchor beacon, the environmental information of the reader device including at least temperature;

detecting, by the reader device, one or more signals from an asset tracking tag; and identifying, by the one or more processors, a location of the asset tracking tag based on the estimated position of the reader device and signal strength information for each of the one or more detected signals from the asset tracking tag.

2. The method of claim 1, wherein estimating the position of the reader device includes comparing the received signal strength of one of the one or more beacon signals and the physical location of the at least one anchor beacon against stored calibration data.

3. The method of claim 2, wherein comparing the received signal strength of one of the one or more beacon signals and the physical location of the at least one anchor beacon against the stored calibration data includes performing a second comparison for another received signal strength from a different anchor beacon.

4. The method of claim 2, wherein the calibration data includes at least one of environmental information of an operational area or electromagnetic signature information of the operational area.

5. The method of claim 1, further comprising:

obtaining, by the reader device, the environmental information of the reader device;

wherein each of the detected beacon signals further includes the environmental information of the anchor beacon.

6. The method of claim 1, wherein estimating the position of the reader device further includes estimating, according to a machine learning algorithm, a distance between the anchor beacon and the reader device using the received signal strength of the one or more beacon signals.

7. The method of claim 5, wherein the one or more signals from the asset tracking tag includes environmental information of the asset tracking tag associated with an ambient environment of the asset tracking tag.

8. The method of claim 7, wherein identifying the location of the asset tracking tag is further based on the environmental information of the asset tracking tag and the environmental information of the reader device.

9. The method of claim 8, wherein identifying the location of the asset tracking tag includes identifying at least one of a room or a floor in which the asset tracking tag is located.

10. The method of claim 8, wherein identifying at least one of a room or a floor of the asset tracking tag includes determining if the environmental information of the asset tracking tag and the environmental information of the reader device are in agreement.

11. A system configured to locate at least one asset tracking tag, the system comprising:

at least one anchor beacon;

at least one reader device;

memory configured to store location information for one or more of the at least one anchor beacon, the at least one reader device, or at least one asset tracking tag; and one or more processors operatively coupled to the memory, the one or more processors being configured to:

obtain one or more beacon signals from the at least one anchor beacon, each of the obtained beacon signals including anchor beacon identification information, each of the obtained beacon signals being associated with a received signal strength upon receipt at the at least one reader device, the anchor beacon identification being associated with a physical location of the anchor beacon;

estimate a position of the at least one reader device according to the received signal strength of the one or more beacon signals and the physical location of the at least one anchor beacon from the anchor beacon identification information, wherein the estimation includes a comparison of environmental information of the reader device associated with an ambient environment of the reader device to environmental information of the anchor beacon, the environmental information of the reader device including at least temperature;

obtain one or more signals from the at least one asset tracking tag; and identify, by the one or more processors, a location of the at least one asset tracking tag based on the estimated position of the at least one reader device and signal strength information for each of the one or more obtained signals from the at least one asset tracking tag.

12. The system of claim 11, wherein the at least one anchor beacon is stationary at the physical location.

13. The system of claim 11, wherein the one or more processors are one or more processors of the at least one reader device.

14. The system of claim 11, further comprising:

a central server;

wherein the one or more processors are one or more processors of the central server.

15. The system of claim 14, wherein the central server is configured to transmit at least one of the position of the at least one reader device or the location of the at least one asset tracking tag to a client device.

16. The system of claim 11, wherein the at least one anchor beacon is a plurality of anchor beacons, the at least one reader device is a plurality of reader devices, and the at least one asset tracking tag is a plurality of asset tracking tags.

17. The system of claim 16, wherein each of the plurality of anchor beacons are each located in a different room or floor within an operational area of the system.

18. The system of claim 11, wherein the memory is further configured to store calibration data, and estimation of the position of the reader device includes a comparison of the received signal strength of one of the one or more beacon signals and the physical location of the at least one anchor beacon against the stored calibration data.

19. The system of claim 11, wherein the at least one anchor beacon, the at least one reader device, and the at least one asset tracking tag are configured to collect environmental information.

20. The system of claim 11, wherein the at least one reader device is stationary or mobile.

* * * * *